June 2, 1964 E. ZLOBIN 3,135,118
THERMO CUP
Filed Dec. 23, 1960
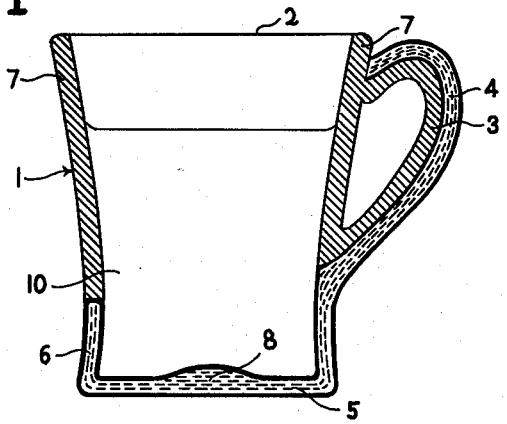
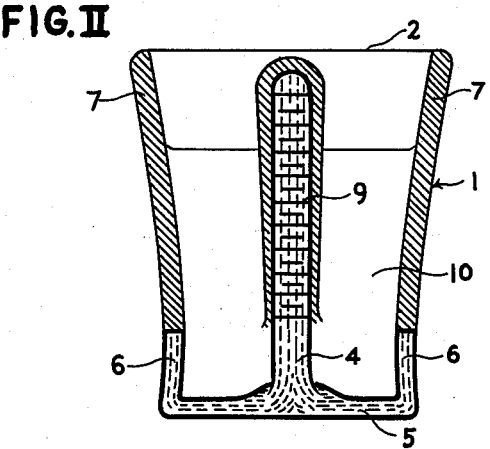
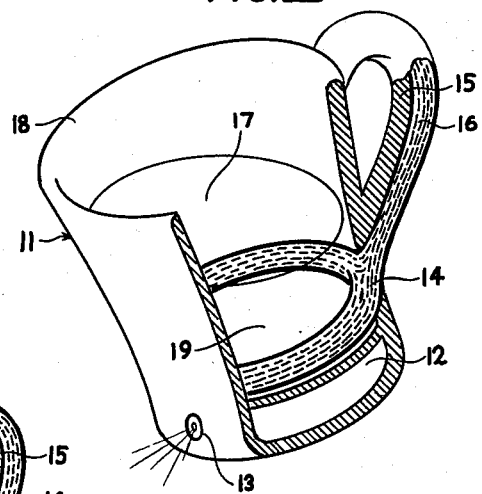
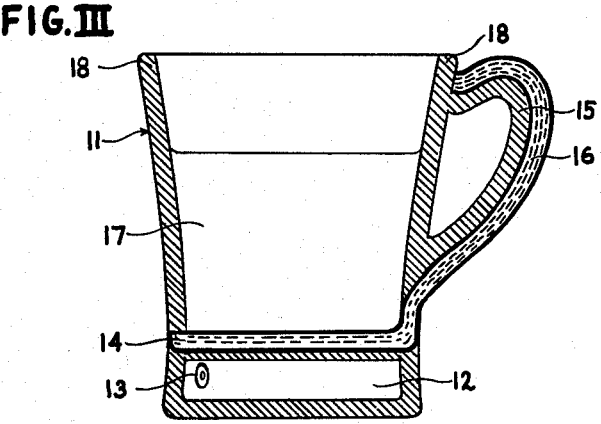
EUGENIUSZ ZLOBIN
Inventor
by James J. Ralabate
Attorney United States Patent Office 3,135,118
Patented June 2, 1964

3,135,118
THERMO CUP
Eugeniusz Zlobin, 104 Oxford Ave., Buffalo 9, N.Y.
Filed Dec. 23, 1960, Ser. No. 78,108
3 Claims. (Cl. 73—368)

This invention relates to a novel form or structure for a cup or the like. More specifically, the novel concept of this invention resides in a cup having integral therein, a temperature indicating device.

The structure of this invention comprises a cup having therein a bottom chamber which has a tube like outlet extending into and through the handle of said clup. Positioned in this bottom chamber is a heat-responsive liquid adapted to expand upon being heated. When a hot liquid is poured into this cup, the heat-responsive liquid will quickly and accurately indicate the liquid temperature. A calibrated indicator scale can be positioned on the handle so that the exact temperature of the liquid can be determined. If it is desired, the indicator scale can be left off the cup. In this event, the handle means of the cup will glow red, or other color, when a hot liquid is poured into the cup. The heat-responsive liquid may be any conventional liquid such as mercury or stained alcohol, or the like. The indicator means also may be put in any portion of the cup rather than positioned in the handle. Also, the cup and handle may be made of a non-transparent material. However, the temperature indicator should be transparent. Stained alcohol is preferred since color can easily be imparted to the alcohol; in this manner the colored alcohol will cause the handle means to glow when the containing liquid is hot and return to normal when the liquid is cooled.

A further modification that may be incorporated into the cup is a whistle or sound alarm indicating that the containing liquid is hot. This sound system comprises an air chamber positioned preferably in the bottom or side wall portion of the cup. A whistle or sounding means is positioned therein in the form of an aperture-like whistle means extending from the air chamber to the atmosphere. Upon pouring a hot liquid into the cup, the air in the chamber will expand and escape through the aperture-like whistle means thereby activating the whistle. This sound-alarm means may be used in the cup to indicate the temperature of the containing liquid independently of the above discussed visual means (the heat-responsive liquid). It is preferred, however, that both the visual and sounding indicator means be used together on the cup container. When both temperature indicator means are used, the following arrangement may be utilized: the bottom most portion of the cup or the side wall comprises an air chamber completely closed except for an air escape aperture in the form of a whistle means, positioned either in the lower or upper side portion of cup. Immediately above the air chamber is positioned the heat-responsive liquid which is adapted to flow into the handle of the cup. It is preferred that the heat-responsive liquid be positioned in a chamber extending around the outer periphery of the cup in the form of a ring-like means. The contained liquid makes contact with the heat-responsive liquid chamber, and at the same time is in heat-conductive contact with the air chamber which has its upper portion exposed to the contained liquid at the center portion of the ring formed by the peripheral tubular heat-responsive liquid chamber. This arrangement and other modifications will be more clearly described in connection with the accompanying drawings. It should be understood, however, that the preferred embodiment of this invention comprises a cup containing both visual temperature indicating means (the heat-responsive liquid which, upon being heated, will expand into the handle, and the sound temperature indicating means (the air chamber wherein the contained air will expand upon being heated, and escape through a whistle means).

It is highly desirable that some drinking container be made available that will easily and conveniently indicate the temperature of the containing liquid. This is so particularly when children are given heated liquids to drink. A drinking vessel of this nature must, in addition to being useful as such, be economical. The prior art does not make available a drinking cup wherein integral with the cup structure is a temperature indicating means. It is, therefore, an object of this invention to provide a cup structure that is adapted to easily indicate the temperature of the contained liquid.

It is a further object of this invention to provide an integral temperature indicating means which is easily observed to indicate containing liquid temperature.

A further important object of this invention is to provide a drinking vessel which contains both visual and sounding temperature indicating means.

A still further object is to provide a drinking vessel that will be, in addition to being functional and economical, novel in appearance and function.

Other and further objects will become apparent upon a further reading of this disclosure.

The inventive concept certainly is capable of a variety of mechanical expressions or modifications. The accompanying drawing illustrates various embodiments of this invention. It should be understood, however, that the following description of the enclosed drawing is meant to illustrate, not limit the construction of the drinking vessel of this invention.

FIGURE I is a view in vertical section of a cup constructed in accordance with the present invention.

FIGURE II is a sectional view of the same cup as illustrated in FIGURE I but at a right angle thereto.

FIGURE III is a view in vertical section of a preferred embodiment of this invention.

FIGURE IV is a perspective view partly cut away of the cup illustrated in FIGURE III.

Referring first to FIGURE I; cup 1 is provided with a top opening 2. Handle 3 has integral therewith a tube-like channel or chamber 4 extending through substantially its length. The channel 4 extends into base chamber 5, which is positioned in the bottom portion of cup 1. Base chamber 5 can be extended partially up the side of cup 1 as illustrated in side extension 6. The thickness of cup 1 is indicated in the drawing at 7. In base chamber 5 is positioned a heat-responsive liquid 8 such as stained alcohol or the like. Upon being heated by a contained hot liquid, heat-responsive liquid 8 will expand and flow up into channel 4 causing the handle 3 to be colored by the heat-responsive liquid. The side extension 6 provides a means for a more uniform temperature of the contained liquid to be taken. It is preferred in the embodiment illustrated in FIGURE I that a side extension 6 be included in the structure. Contained liquid is shown at 10.

FIGURE II illustrates a front view of the cup structure shown in FIGURE I modified by the inclusion of a calibrated temperature indicating scale 9 on handle 3. Scale 9 provides a simple means for determining the exact temperature of the contained liquid 10. When the contained liquid is poured into cup 1, the temperature of same is indicated on scale 9, and is easily visible to the user or observer.

FIGURE III illustrates a preferred embodiment of this invention. Cup 11 has in its lower portion, an air chamber 12. When a heated liquid is put in cup 11 the air in chamber 12 becomes heated and escapes through whistle means 13, thereby sounding the whistle. Around the upper peripheral portion of chamber 12 is positioned a tubular chamber 14 in which a heat-responsive liquid is positioned. This tubular chamber 14 is positioned around the upper peripheral portion of the chamber 12, and extends up and through the handle 15, as illustrated at 16. Handle 15 may or may not be calibrated, depending on the type of structure desired. Contained liquid 17 is in heat conductive contact with both the upper portion of chamber 12, and with the heat-responsive liquid chamber 14; thus both temperature indicating means may be observed in determining the temperature of the contained liquid 17. The thickness of cup 11 is indicated by numeral 18.

FIGURE IV is a perspective view of the cup illustrated in FIGURE III. Contained liquid 17 contacts chamber 12 at a point 19, and contacts heat-responsive tubular chamber 14 at the same time. Thus both temperature indicating devices are activated simultaneously.

The structure of this invention may be made of any suitable material such as glass, plastic, or the like. Although it is preferred that a transparent material be used, it is only required that there be transparency at the handle means.

Many modifications and ramifications of the above disclosed invention will naturally suggest themselves to those skilled in the art, based on the disclosure of this basic invention. These are intended to be comprehended within the scope of this invention.

I claim:

1. A drinking cup comprising in combination, a containing liquid means, a cup handle means, a heat-responsive liquid chamber, a heat-responsive liquid, an air chamber, and a whistle means, said air chamber positioned at the bottom most portion of said cup, and having thereon said whistle means which extends from the internal portion of said air chamber to the atmosphere, said heat-responsive liquid chamber positioned immediately above said air chamber, and extending outwardly from said cup and into and through said handle means, said heat-responsive liquid positioned in said heat-responsive liquid chamber and adapted to expand from said heat-responsive liquid chamber into and through a tubular means positioned in said handle means.

2. A drinking cup comprising in combination, a containing liquid means, a cup handle means, a heat-responsive liquid chamber, a heat-responsive liquid, an air chamber, and a whistle means, said air chamber positioned in the side wall portion of said cup, and having thereon said whistle means which extends from the internal portion of said air chamber to the atmosphere, said heat-responsive liquid chamber positioned in the lower base portion of said cup, and extending outwardly from said cup and into and through said handle means, said heat-responsive liquid positioned in said heat-responsive liquid chamber, and adapted to expand from said heat-responsive liquid chamber into and through a tubular means positioned in said handle means.

3. A drinking cup adapted to contain hot drinks comprising a base; an upwardly extending sidewall joined to said base and defining therewith a drink-receiving portion, said base being provided with a chamber containing a heat-expansible liquid, said chamber extending upwardly around the entire periphery of said base into the portion of said sidewall adjacent said base; and a closed channel opening from said chamber and extending upwardly therefrom, said channel being normally empty but adapted to receive a portion of said heat-expansible liquid when said liquid becomes heated by a hot drink in said drink-receiving portion, said portion of liquid being visible in said channel whereby to give a visual warning.

References Cited in the file of this patent

FOREIGN PATENTS

| | | |
|---|---|---|
| 189,259 | Switzerland | May 18, 1937 |
| 884,051 | Germany | July 13, 1953 |